Oct. 19, 1965          B. M. WILGUS          3,212,244
POWER MOWER
Filed March 7, 1963                                   3 Sheets-Sheet 1
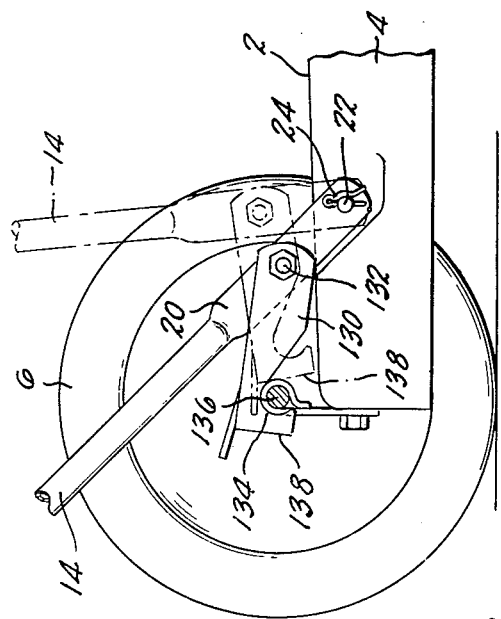
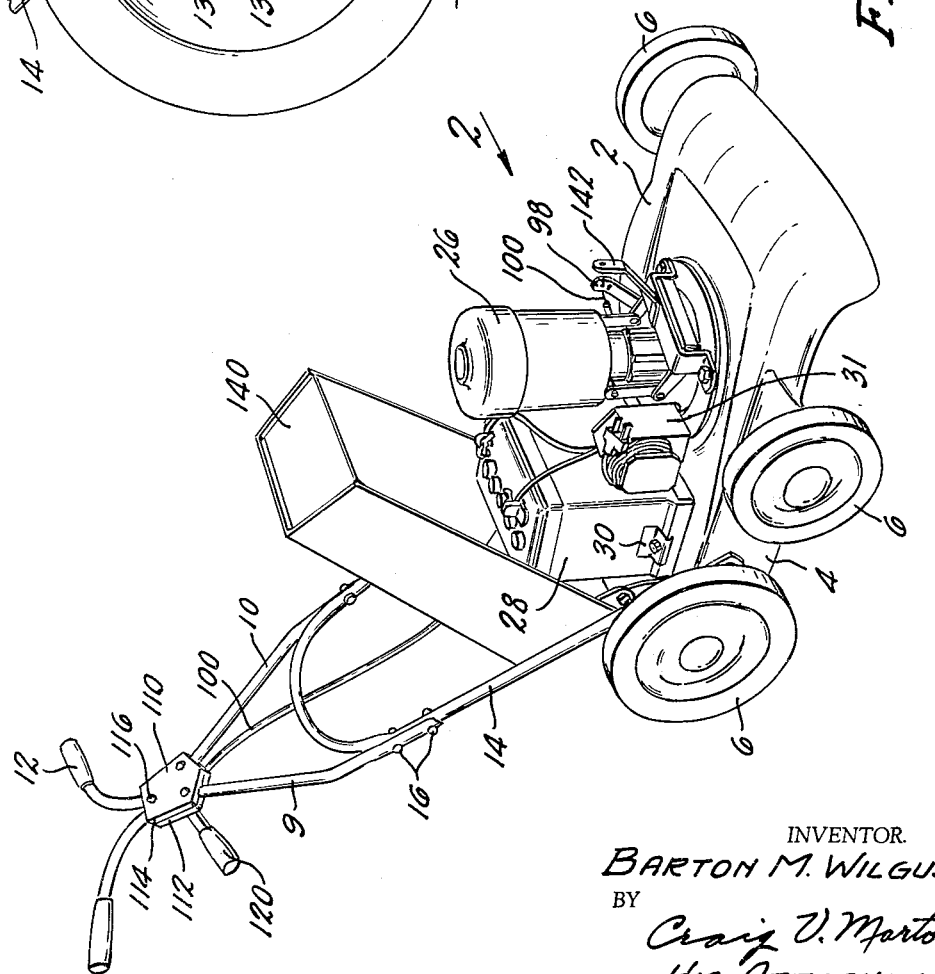
INVENTOR.
BARTON M. WILGUS
BY Craig V. Morton
HIS ATTORNEY

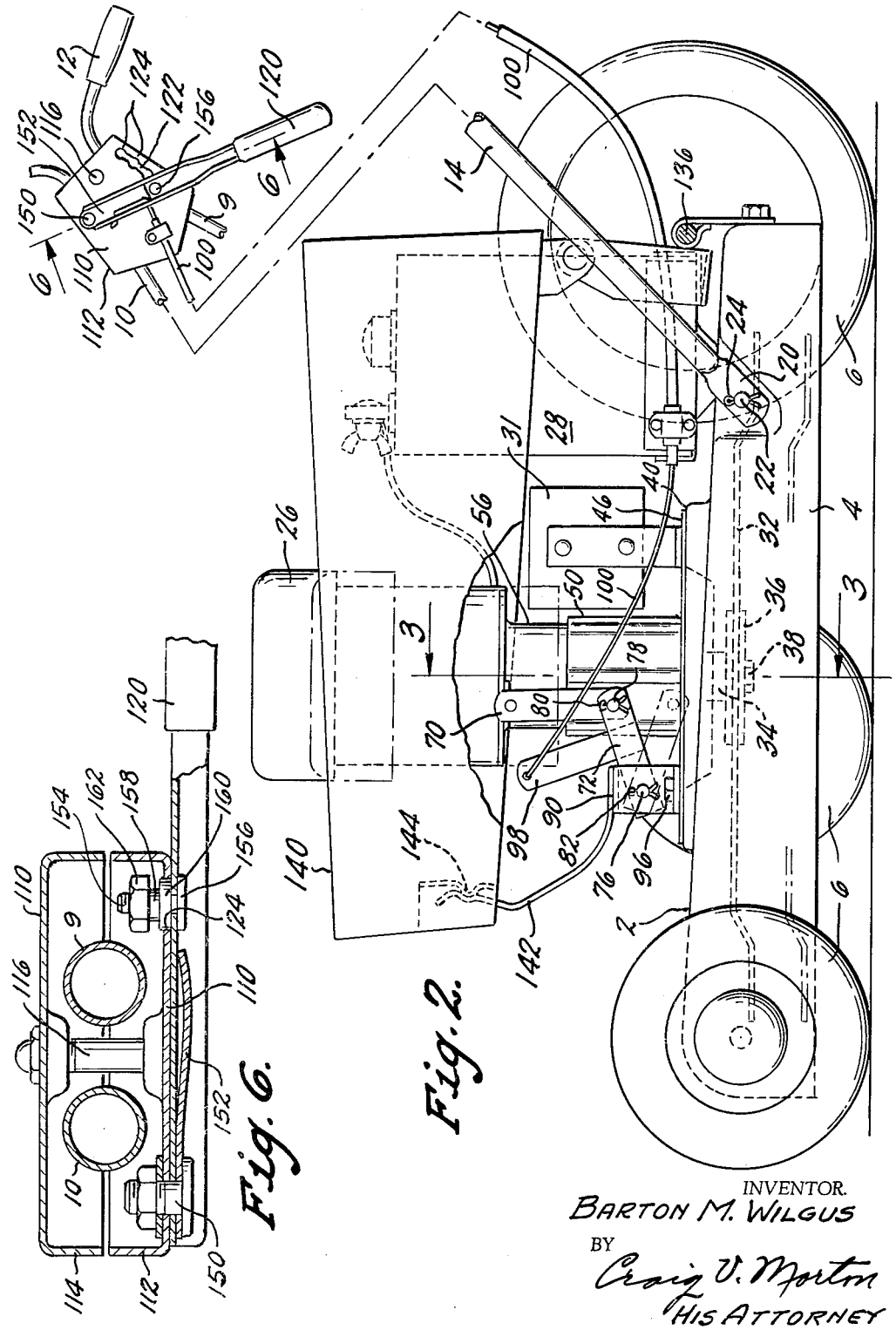

Oct. 19, 1965   B. M. WILGUS   3,212,244
POWER MOWER
Filed March 7, 1963   3 Sheets-Sheet 3
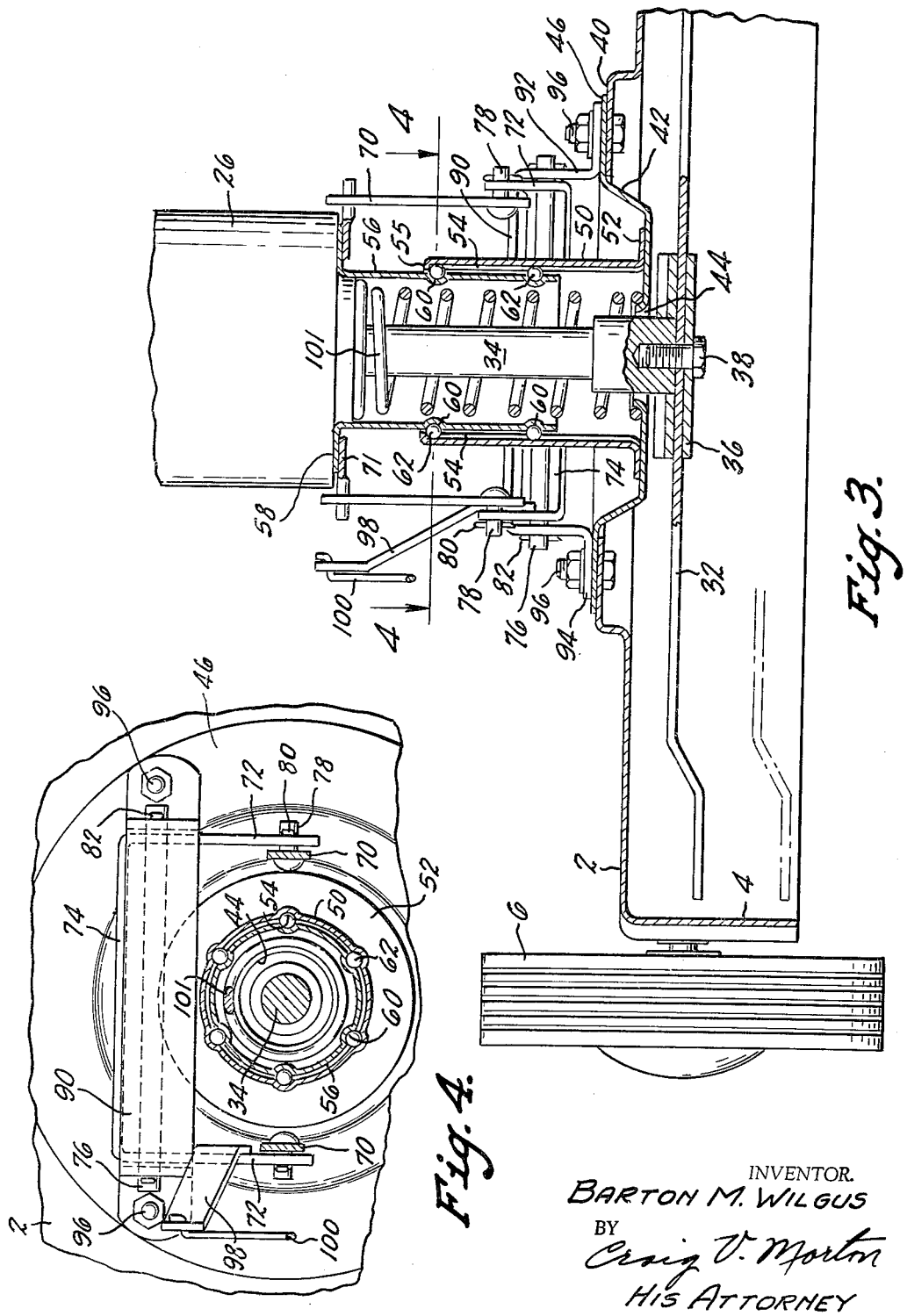
INVENTOR.
BARTON M. WILGUS
BY Craig V. Morton
HIS ATTORNEY

United States Patent Office 3,212,244
Patented Oct. 19, 1965

3,212,244
POWER MOWER
Barton M. Wilgus, West Milton, Ohio
(R.R. 1, Box 422, Vandalia, Ohio)
Filed Mar. 7, 1963, Ser. No. 263,530
3 Claims. (Cl. 56—25.4)

This invention relates to improvements in power mowers of the type embodying a horizontal platform or support having flanges extending downwardly from such support toward the surface to be cut and which is supported on four wheels which are rotatable over said surface when the device is in operation. In devices of this type, a source of power, such as a small engine or an electric motor, is carried by the supporting platform, above the platform, and has a driving shaft extending through the platform to which a rotating cutter blade is suitably secured to the lower end of said shaft below the platform.

Mowers of the character referred to are primarily of two types in one of which the source of power, either engine or electric motor, is fixedly secured to the top of the supporting platform and adjustment of the cutter blade, to change its position with respect to the surface over which the mower is moved, is effected independently of the source of power by moving it up or down on operating shaft and locking it in its adjusted position by some suitable means. In the other type, when the position of the cutter is changed vertically, the source of power and the cutter are moved up or down as a unit and are both locked in position by some suitable device. The present invention relates to the latter type of mower.

It is the principal object of the present invention to provide novel and improved means for effecting vertical adjustment of the source of power and cutter blade as a unit, which is so constructed that this results can be effected and the unit will be operable in any desired position without substantial vibration or other objectionable effects.

Mowers of the character described are usually provided with a handle by means of which the mower is either manually pushed over the surface to be mowed by the operator or is guided by the operator in the event that the mower is self-propelled. A further feature of this invention resides in the provision of means supported by the handle within easy reach of the operator to effect movement of the source of power and cutter blade as a unit and means of latch said last named means in any desired position of adjustment.

A further feature of the invention resides in the provision of an operating or controlling handle which is pivotally connected to the mower so as to be movable from its operating position to one in which it extends directly vertically above the mower to facilitate storage in a relatively small space and means for locking such handle in its adjusted positions.

Further objects and advantages of the present invention will be apparent from the following description, reference being had to the accompanying drawings wherein a preferred embodiment of the present invention is clearly shown.

In the drawings:

FIGURE 1 is a perspective view of the entire mower as seen from a position in front of the device.

FIGURE 2 is an enlarged side elevation of the mower looking in the direction of the arrow 2 in FIGURE 1 and which is partly schematic.

FIGURE 3 is a vertical section on the line 3—3 of FIGURE 2.

FIGURE 4 is a detail horizontal section on the line 4—4 of FIGURE 3.

FIGURE 5 is an enlarged detail view of the locking means for the operating handle.

FIGURE 6 is an enlarged cross sectional view of the height adjusting lever mechanism.

In the drawings and referring particularly to FIGURE 1, the horizontal supporting platform 2 has a flat top surface and an integral depending flange 4 which surrounds the cutter blade.

Four wheels 6 are rotatable mounted on shafts or axles, which are fixedly secured in any desirable way in the supporting platform 2. The detailed construction of axle shafts, the mounting therefor and detailed mounting means for the wheels is not shown because such structure forms no part of the present invention and is substantially similar to what is ordinarily employed in this general type of mower.

As previously indicated, mowers of this type are both self-propelled and are adapted to be pushed over the surface to be mowed by the manual effort of the operator. That specifically disclosed herein is manually operated and to this end an operating handle comprising two tubular bars 9 and 10, the ends of each of these bars being provided with a handle 12 of rubber or similar material which is adapted to be gripped by the operator. The two bars 9 and 10 are held together by a curved tubular bar 14 which is secured to the lower ends of bars 9 and 10 by bolts 16. The bar 14 is substantially U-shaped, as indicated in FIGURE 1, and its lower ends are connected to the supporting platform 2 at opposite sides thereof. Each lower end of bar 14 is flattened as indicated at 20 in FIGURE 2 and has a hole through which a pin 22 projecting from the wall 4 extends, when the handle is assembled on the mower. Each end of bar 14 is held in assembled position by a cotter pin 24, or other suitable means.

As shown herein, the cutter blade is operated by an electric motor, which is driven by a storage battery 28 carried by the platform 2 and held in position by clamping plates 30. The battery provides sufficient current to cut a predetermined area, for example 10,000 square feet, and when the mower is not in use, a battery charger 31, which may be mounted on the platform 2 in any desirable way, is adapted to be connected to any suitable source of current to effect recharging of the battery. The arrangement of battery and recharger therefor forms no part of this invention and is not claimed herein.

The cutter blade, previously referred to, is designated at 32 and is secured to the lower end of the motor shaft 34 to be rotated thereby in a substantially horizontal plane and at high speed by the motor, when in operation. The specific manner of securing the blade to its drive shaft is not material, but, as shown, the blade is positioned in an inverted U-shaped channeled member 36 secured to the motor shaft and is held in position therein by a bolt 38.

The motor is mounted on the platform 2 so as to be held against rotary motion but is movable vertically to adjust the blade in the following manner. The platform 2 has an annular raised surface 40 surrounding a central opening in which is positioned an annular member 42, the central portion of which extends downwardly to some extent into said opening. This member 42 has a central opening 44 through which the motor shaft 34 extends. The member 42 has a projecting flange 46 which is secured by bolts to the platform 2.

Surrounding the opening 44 and spaced therefrom is an outer sleeve 50 which has a projecting flange 52 that is welded to the member 42 but may be bolted thereto if desired, the sleeve being thus held in perfectly rigid relation to the platform 2. This sleeve has six vertical grooves 54 on its inner surface, as shown best in FIGURE 4, for a purpose more fully set forth later. These grooves terminate just below the top of the sleeve 50, as indicated at 55.

An inner sleeve 56 has a projecting flange 58 which is secured in any suitable way as by bolts or welding, to the bottom of the motor housing, as best shown in FIGURE 3. This sleeve extends downwardly into sleeve 50 and is only slightly spaced therefrom. This inner sleeve has two circumferential rows of depressions 60, as shown in FIGURES 3 and 4, these depressions being adjacent the grooves 54, there being six grooves and 12 depressions cooperating therewith. Positioned in each depression is a ball 62 and these balls slide up and down in the grooves 54 as the motor is raised and lowered, enabling this to be done with a minimum of friction, but preventing any rotary movement of the motor, thus providing a rigid structure with vibration substantially eliminated.

To effect vertical movements of the motor, two bars 70 are provided. These bars, at their upper ends, have orifices through which extend pins which are flattened at their inner ends as at 71, and are welded or otherwise secured to the flange 58. At their lower ends the bars 70 are pivotally connected to the rear ends of side bars 72 of a U-shaped yoke having a front bar 74. The yoke is pivoted on a rod 76 supported on the flange 46 in a manner later described. Arms 70 are connected to the yoke by pins 78 through which cotter pins 80 extend. The rod 76 is held in position by cotter pins 82.

The rod 76 is supported in a bracket having a horizontal portion 90 integral with two vertical parts 92, each of which has an extending flange 94 and these flanges are held in fixed position by bolts 96 extending through both the flange 46 and the raised portion 40 of platform 2.

Obviously, if the yoke 74 is rocked on the rod 76, the bars 70 and the motor to which they are connected, will be raised or lowered, depending on the direction of movement of the yoke. To effect movement of the yoke, a bar 98 is welded to the left side bar 72, as seen in FIGURES 3 and 4, intermediate the ends thereof, as indicated in FIGURE 1. The motor is normally held in its upper position, as in FIGURE 3, by a spring 101. This spring is positioned in the space between the motor shaft 34 and the inner sleeve 56, the upper end engaging the bottom of the motor and the lower end engaging the member 42, as clearly shown in FIGURE 3. If the upper end of bar 98 is pulled rearwardly, the motor will be moved downwardly against the force of the spring and if bar 98 is permitted to move forwardly, the spring will move the motor and cutter blade upwardly.

To move the bar 98, its upper end is connected to the wire 100 of a Bodwen cable, the other end of said wire being connected to and operated by a lever positioned close to the operating handles 12. It will be noted that the bars 9 and 10, near the operating handles 12 are close together, as shown in FIGURE 1. Above and below these bars are two plates 110 which are spaced from each other when assembled by two flanges 112 and 114 which are normal to the plates. When assembled, the plates are held together by bolts 116 and the bars 9 and 10 are positioned between the plates. Also positioned between the plates and pivoted thereon in any suitable way is an operating handle 120 which is connected to the wire 100 of the Bowden cable which operates arm 98 to effect movements of the motor and cutter blade. In the lower plate 110 is an arcuate slot 122 having notches 124 with which any suitable form of spring detent associated with lever 120 cooperates to hold the lever in its desired position of adjustment. The lever can be easily reached by the operator of the mower, moved to the desired position and retained therein by the detent, to maintain the motor and cutter blade in the desired position.

As stated previously, the operating handle can be locked in the FIGURE 1 position or in a position such as shown in dotted lines in FIGURE 5. For this purpose a latch member 130 is pivoted on a bolt 132 extending the flattened lower right end of bar 14. This latch member has a notch 134 which, when the handle is in operating position as shown in full lines, engages a transverse rod 136 which is the axle shaft of the rear wheels. If it is desired to lock the handle in the dotted line position, the handle is pushed downwardly enough to enable the notch to be disengage from the rod 136 manually. The handle is then moved to the dotted line position and the member 130, being pivoted, can drop down to the dotted line position, where the end 138 abuts the rod 136 and holds the handle in its vertical position.

A hinged cover 140 is pivoted on the platform 2 in any suitable way and can be moved from the FIGURE 1 position to the FIGURE 2 position where it covers the storage battery, the charger and other elements, but the upper end of the motor extends through an opening in the cover as indicated in FIGURE 2. It is latched in the FIGURE 2 position by a spring arm 142, extending upwardly from the horizontal part 90 of the yoke supporting bracket. This spring arm 142 cooperates with a latching surface 144 formed on the inside of the cover 140, and must be released to move the cover to the FIGURE 1 position. This cover and latching arrangement need to be more specifically shown or described as none of the claims are directed thereto.

As has been stated previously, any suitable form of spring detent or other retaining means could be employed to hold the lever 120 which raises and lowers the motor and cutter blades to adjusted positions. However, in FIGURE 6, the specific mechanism employed to effect this function is shown and will now be described. As already stated, an arcuate slot 122 formed on the member 112 is associated with the lever 120 and this slot has alternate wide and narrow portions as shown in FIGURE 2.

The lever 120 is pivoted on a bolt 150 which extends through a hole in the member 112 and also through a flat spring 152 which urges the lever 120 upwardly. The lever 120 carries a pin 154 which extends through the slot 124. This pin has an enlarged head 156 below the lever, a narrow portion 158 and a larger portion 160, both of which cooperate with the slot 122, the pin being held in position on lever 120 by a nut 162.

Normally, spring 152 holds the parts in the FIGURE 6 position with the part 160 engaging the slot 122 and holding the lever 120 against movement. If it is desired to change the position of the motor and cutter blade, the arm 120 is pushed downwardly to bring the surface 158 into the slot 122. When this is done the lever 120 can be moved freely. It is then moved to the desired position, is released so that spring 152 moves it to the position shown in FIGURE 6, where it is again located in set position.

While the embodiment of the present invention as herein disclosed constitutes a preferred form, it is to be understood that other forms might be adopted.

What is claimed is as follows:

1. A power operated lawn mower comprising in combination a substantially horizontal supporting platform, wheels rotatably mounted thereon so that the mower can be rolled over the surface to be mowed, a motor positioned above said platform and carried thereby, said motor having a drive shaft extending downwardly through the supporting platform and having a cutter blade secured to the lower end thereof below the supporting platform, means for supporting the motor on said platform which is so constructed that the motor may be moved vertically to effect vertical movements of the cutter blade to vary its position relative to the surface to be mowed, said supporting means including an inner cylindrical sleeve secured to the bottom of the motor spaced from and surrounding the downwardly extending drive shaft, an outer cylindrical sleeve secured to the supporting platform and surrounding the inner sleeve, a plurality of vertical channels in the inner surface of said outer sleeve, means projecting from said last named channels and engaging the channels in the outer surface of the inner sleeve to prevent rotary movement of the sleeves relative to each other but permitting vertical movement of the inner sleeve to effect vertical movement of the motor and cutter blade, and manual means to move the motor vertically and hold it in any desired adjusted position.

2. A power operated lawn mower comprising in combination, a substantially horizontal supporting platform, wheels rotatably mounted thereon so that the mower can be rolled over the surface to be mowed, a motor positioned above said platform and carried thereby, said motor having a drive shaft extending downwardly through the supporting platform and having a cutter blade secured to the lower end thereof below the supporting platform, means for supporting the motor on said platform which is so constructed that the motor may be moved vertically to effect vertical movements of the cutter blade to vary its position relative to the surface to be mowed, said supporting means including an inner sleeve secured to the bottom of the motor spaced from and surrounding the downwardly extending drive shaft, an outer sleeve secured to the supporting platform and surrounding the inner sleeve, a plurality of vertical channels in the inner surface of the outer sleeve, a plurality of depressions circumferentially positioned on the outer surface of the inner sleeve contiguous to said channels, members positioned in said depressions and projecting beyond the outer surface of the inner sleeve to engage said channels, whereby rotatary movement of the sleeves relative to each other is prevented, but permitting vertical movement of the inner sleeve to effect vertical movement of the motor and cutter blade, and manual means to move the motor vertically and hold it in any desired adjusted position.

3. A power operated lawn mower comprising in combination, a substantially horizontal supporting platform, wheels rotatably mounted thereon so that the mower can be rolled over the surface to be mowed, a motor positioned above said platform and carried thereby, said motor having a drive shaft extending downwardly through the supporting platform and having a cutter blade secured to the lower end thereof below the supporting platform, means for supporting the motor on said platform which is so constructed that the motor may be moved vertically to effect vertical movement of the cutter blade to vary its position relative to the surface to be mowed, said supporting means including an inner sleeve secured to the bottom of the motor spaced from and surrounding the downwardly extending drive shaft, an outer sleeve secured to the supporting platform and surrounding the inner sleeve, a plurality of vertical channels in the inner surface of the outer sleeve, a plurality of depressions circumferentially positioned on the outer surface of the inner sleeve continguous to said channels, balls positioned in said depressions and projecting beyond the outer surface of the inner sleeve to engage said channels, whereby rotatary movement of the sleeve relative to each other is prevented, but permitting vertical movement of the inner sleeve to effect vertical movement of the motor and cutter blade, and manual means to move the motor vertically and hold it in any desired adjusted position.

References Cited by the Examiner
UNITED STATES PATENTS

| | | | |
|---|---|---|---|
| 2,329,185 | 9/43 | Coddington | 56—295 X |
| 2,480,944 | 9/49 | Malpass | 56—25.4 |
| 2,825,196 | 3/58 | Gudmundsen | 56—25.4 |
| 2,968,902 | 1/61 | Brown | 56—25.4 |

ABRAHAM G. STONE, *Primary Examiner.*

CARL W. ROBINSON, ARNOLD RUEGG, T. GRAHAM CRAVER, *Examiners.*